United States Patent
Gibbons, Jr.

(10) Patent No.: US 9,327,608 B2
(45) Date of Patent: May 3, 2016

(54) EXTENDABLE AND DEFORMABLE CARRIER FOR A PRIMARY COIL OF A CHARGING SYSTEM

(75) Inventor: Donald Gregory Gibbons, Jr., Wake Forest, NC (US)

(73) Assignee: SCHNEIDER ELECTRIC USA, INC., Schaumburg, IL (US)

( * ) Notice: Subject to any disclaimer, the term of this patent is extended or adjusted under 35 U.S.C. 154(b) by 830 days.

(21) Appl. No.: 13/198,297

(22) Filed: Aug. 4, 2011

(65) Prior Publication Data

US 2013/0033227 A1    Feb. 7, 2013

(51) Int. Cl.
*B60L 11/18*    (2006.01)

(52) U.S. Cl.
CPC ........... *B60L 11/1829* (2013.01); *B60L 11/182* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ......... H02J 5/005; H02J 7/025; B60L 11/182; B60L 11/1829
USPC ................... 320/108, 109; 307/104
See application file for complete search history.

(56) References Cited

U.S. PATENT DOCUMENTS

| | | | |
|---|---|---|---|
| 3,914,562 A | 10/1975 | Bolger | 191/10 |
| 4,560,145 A | 12/1985 | Widmer | 254/93 |
| 4,800,328 A | 1/1989 | Bolger et al. | 320/2 |
| 4,836,344 A | 6/1989 | Bolger | 191/10 |
| 4,948,107 A | 8/1990 | Orndorff, Jr. | 254/93 |
| 5,157,391 A | 10/1992 | Weitzen | 340/825.44 |
| 5,311,973 A | 5/1994 | Tseng et al. | 191/10 |
| 5,341,083 A | 8/1994 | Klontz et al. | 320/2 |
| 5,498,948 A | 3/1996 | Bruni et al. | 320/2 |
| 5,528,113 A | 6/1996 | Boys et al. | 318/16 |
| 5,573,090 A | 11/1996 | Ross | 191/10 |
| 5,710,502 A | 1/1998 | Poumey | 320/2 |
| 5,821,731 A * | 10/1998 | Kuki et al. | 320/108 |

(Continued)

FOREIGN PATENT DOCUMENTS

| | | | | |
|---|---|---|---|---|
| DE | WO 2012084095 A2 * | 6/2012 | | B60L 11/182 |
| EP | 0 788 212 | 8/1997 | | |
| GB | 2471879 A * | 1/2011 | | B60L 11/1816 |
| JP | 08-111908 A | 4/1996 | | B60L 11/18 |
| JP | 11-273977 A | 10/1999 | | B60L 11/18 |
| JP | 2001-359203 A | 12/2001 | | B60L 11/18 |
| JP | 2008-054423 A | 3/2008 | | B60L 11/18 |
| JP | 2009-106136 A | 5/2009 | | B60L 11/14 |
| WO | WO 2011/049352 A2 | 4/2011 | | H02J 17/00 |

OTHER PUBLICATIONS

International Search Report mailed May 24, 2013 which issued in corresponding International Patent Application No. PCT/US2012/053101 (5 pages).
Written Opinion mailed May 24, 2013 which issued in corresponding International Patent Application No. PCT/US2012/053101 (4 pages).

*Primary Examiner* — Yalkew Fantu
*Assistant Examiner* — Manuel Hernandez
(74) *Attorney, Agent, or Firm* — Locke Lord LLP

(57) ABSTRACT

A subsurface mounted inductive charging coil system for electric vehicles accommodates the gap distance between primary charging coil and secondary coil on the vehicle with an extendable primary coil carrier. The system protects the primary coil when exposed by mounting on a deformable and elastic structure. By keeping the primary coil normally hidden in a deformable and elastic structure several advantages are obtained. The extendable structure is preferably a low pressure inflatable bladder or membrane in the floor for carrying, protecting, and extending the primary coil.

19 Claims, 2 Drawing Sheets

(56) References Cited

U.S. PATENT DOCUMENTS

| | | | |
|---|---|---|---|
| 6,817,879 B2 | 11/2004 | Mulvenna et al. | 439/310 |
| 7,740,551 B2 | 6/2010 | Nurnberg et al. | 473/570 |
| 7,880,337 B2 | 2/2011 | Farkas | 307/104 |
| 2010/0219796 A1* | 9/2010 | Kallmyer | 320/153 |
| 2011/0074346 A1 | 3/2011 | Hall et al. | |
| 2011/0133692 A1 | 6/2011 | Shimoyama | |
| 2012/0119699 A1* | 5/2012 | Carbunaru et al. | 320/108 |
| 2012/0206098 A1 | 8/2012 | Kim | 320/108 |
| 2012/0293116 A1* | 11/2012 | Tate, Jr. | B60L 11/1829 320/108 |
| 2014/0091757 A1* | 4/2014 | Proebstle | B60L 11/182 320/108 |
| 2014/0232200 A1* | 8/2014 | Maekawa | B63G 8/001 307/104 |
| 2014/0292266 A1* | 10/2014 | Eger | B60L 11/182 320/108 |
| 2014/0340035 A1* | 11/2014 | Maekawa | H01F 27/365 320/108 |
| 2015/0200550 A1* | 7/2015 | Maekawa | H02J 5/005 307/104 |
| 2015/0224882 A1* | 8/2015 | Brill | B60L 11/182 320/108 |

* cited by examiner

EXTENDABLE AND DEFORMABLE CARRIER FOR A PRIMARY COIL OF A CHARGING SYSTEM

BACKGROUND OF THE INVENTION

1. Field of the Invention

The present invention relates generally to electric vehicle charging systems. The present invention relates particularly to induction coil based electric vehicle charging systems for parked vehicles or other stationary objects.

2. Discussion of Related Art

Induction charging of electric vehicles has been proposed in the art. In an induction charging system a primary coil induces a magnetic field into a secondary coil which produces a current subsequently used by on-board electronics of the electric vehicle to charge its batteries. While induction charging can offer advantages over other charging formats, one inescapable limitation of induction charging systems is that efficiency of the systems is very dependent upon proximity of the coils to each other, i.e. the gap distance. Less than two inches of gap is considered efficacious for a through-air proximity distance to achieve over 90% efficiency in induction charging. Efficiency drops off from the optimal with gap distances over two inches.

Some induction charging systems have been proposed for moving vehicles such as in U.S. Pat. No. 3,914,562. Some induction charging systems have been proposed for parked vehicles such as in U.S. Pat. Nos. 5,498,948 or 5,710,502.

SUMMARY

Aspects of the present invention offer improvements to induction charging systems for electric vehicles by providing a carrier protecting and allowing the primary, i.e. charging, coil to be moved closer to the secondary, i.e. sensing, coil of the electric vehicle to increase or optimize the efficiency of energy transfer for battery charging. In various aspects of the present invention the carrier is retractable to be flush with a floor surface, meaning any surface on which the vehicle normally rests and is extendable to rise above the floor surface to decrease the air gap or proximity distance between the primary coil and a secondary coil carried on the vehicle. In other aspects the carrier is deformable and elastic to lessen any inadvertent damage to the charging system or vehicle, for example by incorporating a low pressure inflatable bladder, or inflatable membrane, or the like on which the primary coil is carried. In some aspects the membrane may be a tire-like construct of reinforced rubber supported by a rigid air chamber.

While the primary and secondary "coil" will be referred to herein in the singular, it will be appreciated that multiple coils can be utilized. An electric vehicle as referred to herein may mean any vehicle or moving object drawing at least part of its motive force from a battery powered motor. It will also be appreciated that rechargeable objects other than electric vehicles might utilize the improvements to the art represented by the present invention.

By providing an efficient in-ground electric vehicle charging system according to the aspects of the present invention several other attendant advantages may be gained.

Safety may be enhanced because there are no exposed electrical conductors that would present an electrical shock hazard. The primary coil and associated wiring are embedded in or substantially surrounded and protected to the extent necessary by the reinforced rubber construction of the carrier and the in-ground placement. High power components can be safely located at a distance from the charging primary coil. Convenience and economy may be achieved with the provision of a simple pneumatic and electronic control system so that the driver of an electric vehicle equipped with this invention will never have to manually plug or unplug their vehicle. Charging may conveniently be made hands free, automatic and damage proof. Esthetics and space utilization for an electric vehicle charging system will be improved because the primary coil system can be embedded unobtrusively in a road or parking area surface. Control and communication of the charging system may be had through any known wireless system, for example WI-FI or BLUETOOTH. Reliability can be improved because there is no charging cable to be damaged by abuse, misuse or vandalism. There will also be no concerns about wear of electrical contacts present in existing "corded" plug and socket charging systems.

In one aspect of the invention a charging station for an electric vehicle comprises a primary coil; a first structure surrounding the primary coil, the first structure being carried by an extendable second structure; the charging station having a first position wherein the first structure is held beneath or substantially level to, i.e. flush with, a first surface, and a second position where the first structure is moved by the second structure to be held beyond, i.e. proud of, the level of the first surface, so as to achieve a minimal proximity distance to a secondary coil held in a vehicle a distance from the first surface. It is desirable that the first structure should be deformable and elastic. In various aspects the second structure may also be deformable. The first and second structures may be made integrally.

In a second aspect of the invention a charging station for an electric vehicle comprises a primary coil; a primary coil-carrying first structure surrounding the primary coil, the first structure being carried by an extendable carrier second structure, preferably being inflatable, elastic and deformable; the charging station being seated or mounted in, or at, a first surface and having a first position wherein the primary coil carrying first structure is held unextended beneath or substantially level to the first surface, and a second position in which the primary coil is moved by the extendable second structure to be held substantially above the level of the first surface, so as to achieve a minimal air gap or proximity distance with a secondary coil held in a vehicle a distance from the first surface.

BRIEF DESCRIPTION OF THE DRAWINGS

The foregoing and other advantages of the present disclosure will become apparent upon reading the following detailed description and upon reference to the drawings of which.

DETAILED DESCRIPTION OF A PREFERRED EMBODIMENT

Words of degree, such as "about", "substantially", and the like are used herein in the sense of "at, or nearly at, when given the manufacturing, design, and material tolerances inherent in the stated circumstances" and are used to prevent the unscrupulous infringer from unfairly taking advantage of the invention disclosure where exact or absolute figures and operational or structural relationships are stated as an aid to understanding the invention.

Figure 1:
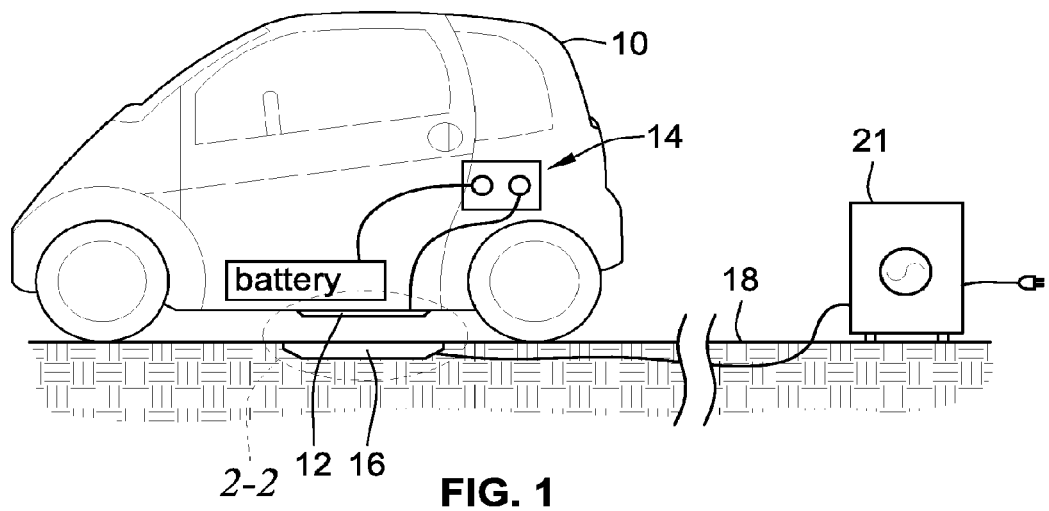
FIG. 1 is a side view of an electric vehicle having a secondary coil parked over a charging station having the primary coil.
Figure 2:
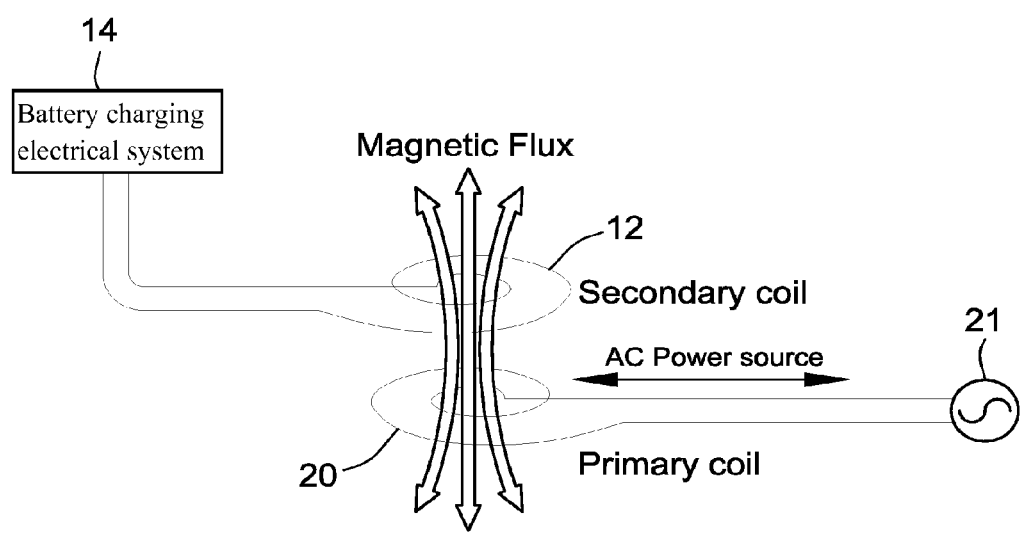
FIG. 2 is a schematic representation of the coils arrangement of FIG. 1.

Referencing FIG. 1, an electric vehicle 10 is carrying a secondary coil 12 for its battery charging electrical and/or electronic system 14 and is parked over a charging station 16 mounted in a floor 18, the floor being the surface the vehicle rests on, whether of earthen or man-made structures such as various forms of pavement. Referencing also the schematic of FIG. 2, the charging station 16 carries the primary, or charging, coil 20 which is connected to a preferably remotely located power grid apparatus 21 supplying the AC power to the induction system. By locating charging station of the present invention beneath the vehicle it is in a safe and convenient location.

Various communication schemes from the vehicle needing charging to the power grid or apparatus supplying power have been proposed in the art. The present arrangement facilitates effective low power wireless communication between the electric vehicle and the charging station, and while not the subject of the present disclosure, can be assumed to be present in the environment of the present invention as indicated schematically by the box 33 in FIGS. 3 and 4 labeled "electronics" which will also serve to schematically indicate sensing apparatus, as further discussed below While shown on the bottom of an air chamber 32, as further discussed below, it will be appreciated the electronics could be arranged in any place or fashion the design dictates.

Figure 3:
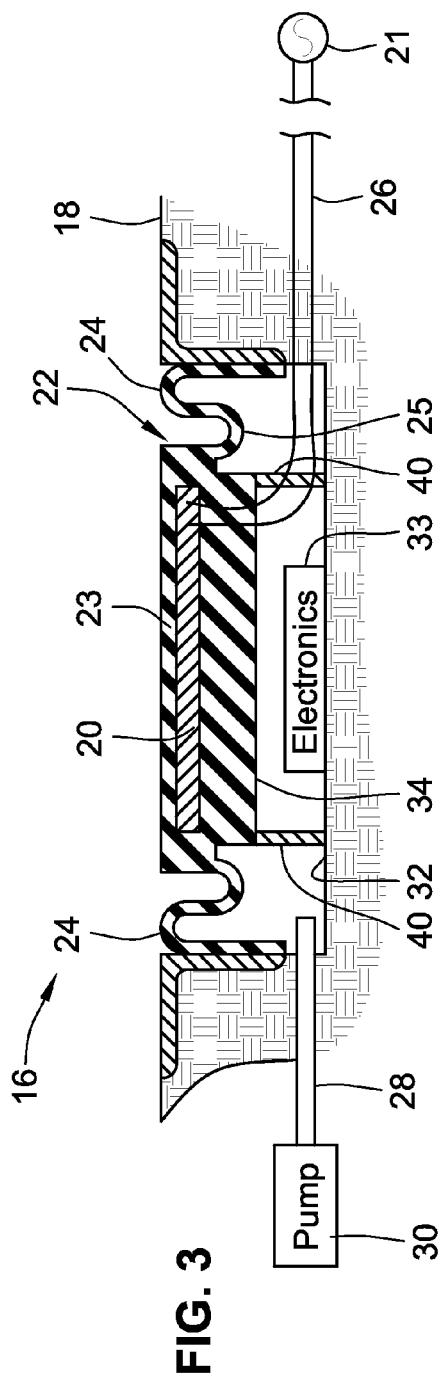
FIG. 3 is a side view cross section of a simplified charging station mounted in a floor with the primary coil carrier retracted.
Figure 4:
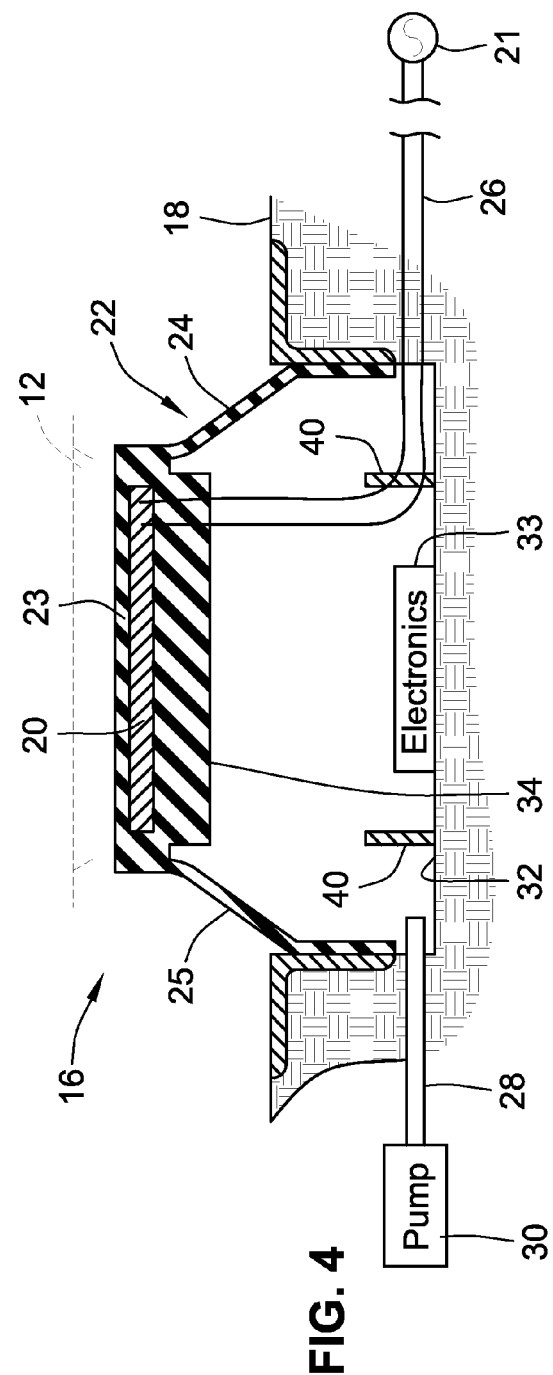
FIG. 4 is a side view cross section of a simplified charging station mounted in a floor with the primary coil carrier extended.

Referencing also FIG. 3, the charging station 16 is shown in a floor-mounted aspect with a simplified side view cross section for explanatory purposes. The charging station 16 is flush-mounted in a floor 18 with the primary coil 20 and its carrier 22 retracted in a first unextended position. For explanatory purposes, the carrier 22 comprises a protective first structure surrounding the primary coil 20 and an extendable second structure 25 attached to the first structure 23 for selectable placement of the primary coil 20 and first structure 23, although it will be appreciated that the first structure 23 and second structure 25 may be formed as a unitary or integral whole. The first structure 23 may comprise various compositions and arrangements of matter if desired. The carrier 22 as shown is an inflatable membrane with flexible sides 24 fastened and sealed to a rigid, box-like air chamber 32. Sides 24 retract below the floor 18 in the first unextended position and extend beyond the floor 18 in a second extended position (FIG. 4). The carrier 22 may be a tire-like construction of rubber or polymer and fiber reinforcement which can be inflatable to various degrees at low pressures. In other aspects the carrier might be a more bladder-like construction. At low pressures the carrier 22 will readily deform and be elastic making it less of a contact hazard, less likely to be damaged, and further providing some degree of conformability to the underside of the electric vehicle 10 and orientation of the secondary coil 12 (FIGS. 1 and 2) if desired. As will be understood in the art, "readily deform" is intended to indicate that deformation and elastic rebound is intended under the normally foreseeable forces attendant with operation of the vehicle charging system; rather than disrupting the apparatus by nonelastic deformation or yielding or distorting too easily under such forces. As illustrated, the bottom surface 34 of the first protective structure 23, e.g. carrier 22, is supported by support posts 40, which may be a single circular support of the like. Alternatively, the interior bottom carrier surface 34 might rest on the bottom surface of the air chamber 32 in a nesting fashion when in the unextended position.

The appropriate power connections 26 to the remote power grid apparatus 21 and the air connections 28 to a pump 30 enter the air chamber 32 beneath the carrier 22 for inflating the carrier 22 to a second extended position thereby extending and positioning the primary coil 20, as seen in FIG. 4, to be held substantially above the level of the floor. The pump 30 as well as the power grid apparatus 21 may be located remotely from the charging station 16. Appropriate valving, electrical connections and the like necessary or desired for the operation of the charging station is considered within the ordinary skill in the art and will understood to be included without further illustration. The pump could be powered by the grid or vehicle battery power or a mechanical system utilizing the weight of the car is also envisioned.

Sensing apparatus, as known in the art may also be present, also indicated schematically by the box 33 in FIGS. 3 and 4 labeled "electronics" as discussed above and may be provided such that when the charging station 16 detects the electric vehicle 10 in position for charging, it directs low pressure air, i.e. air pressure appropriate to the inflation, flexibility, deformability, and elasticity requirements of the carrier 22; e.g. <one (1) psi (7 kPa) into the air chamber 32 to inflate the carrier 22, raise the first structure 23, and bring up the primary coil 20 towards the vehicle so there is less than a 2" (51 mm) gap to the secondary coil 12 allowing charging efficiency greater than 90%. Contact sensors on the carrier for example may be used to stop inflation and allow a selectable or variable degree of extension and placement of the primary coil 20 towards a variety of electric vehicles having variance in their road clearance dimensions. For example, "low pressure" should preferably include a range where the inflatable membrane of the carrier is fully distendable but soft enough to not cause any damage to the secondary coil structure or vehicle at the maximum inflation pressure. A relief valve (not shown) could be used to enforce a maximum inflation level. The primary coil 20 may be two inches or less deep in the dielectric carrier material of the first structure 23 so that when contact is made the gap or proximity distance between the two coils of the induction apparatus is set to allow efficient transfer of power. It will be appreciated that the coil may be surrounded by the carrier to the extent considered necessary or be fully embedded. In some aspects of the invention power may automatically be supplied to start the charging process when the primary coil 20 is placed in proper proximity relation to the secondary coil 12. In other more fault tolerant aspects of the invention charging may proceed at a less than optimal proximity distance. In its refracted position the charging station 16 can be considered to be part of the road/parking surface free from damage caused by traffic, snow plows, or the like.

In other aspects the carrier could be a noninflatable but still deformable and elastic mass raised by a mechanical apparatus such as a scissors jack or the like. The jack might likewise be powered variously by the grid or power taken from the car.

In other aspects a charging system arranged according to the present invention could utilize both primary and secondary coils which are extendible and resiliently mounted if the nature of the electric vehicle makes this necessary or desired.

As illustrated, all electric parts are protected from exposure to people and to the environment. With the primary coil embedded in rubber the system may be rated as essentially waterproof, e.g., meeting NEMA 4x or IP 67 qualifications. The primary coil need not necessarily be totally embedded, e.g. on the interior bottom carrier surface 34 but may be substantially surrounded but left open within the air chamber 32 for ease of connection to the power connector 26.

Among other advantages of the present invention there is no need for wired above ground charging stations. Instead, the present in-ground charging station can be accessed by a smart phone application or even the cars dash board display. Charging commands, vehicle interlock and financial transactions can be made with secure wireless means.

The present invention further presents a robust failure tolerant design. If the carrier is left in the up, i.e. extended, position it will not be damaged by vehicles driving over it since it is under very low pressure. If the carrier does not raise during charging the system will still function but at a lower efficiency.

All hazardous high power charging equipment can be remotely located in protected areas, for example inside buildings adjacent to the street. Also, under proposed Smart Grid (Vehicle-to-Grid) systems, the grid and vehicles may benefit from this connection method since it will be easier to connect electric vehicles to the grid on demand and remotely. "Valley filling," drawing stored power from cars and "peak shaving," storing excess grid capacity into electric vehicles will also be more effective due the easy automatic capability of the hands free, through air, induction system.

Having thus described a charging system for Electric vehicles; it will be appreciated that many variations thereon will occur to the artisan upon an understanding of the present invention, which is therefore to be limited only by the appended claims.

The invention claimed is:

1. A charging station for an electric vehicle comprising:
a primary coil; and
an inflatable membrane having a primary coil carrying first structure surrounding the primary coil, the inflatable membrane further having an extendable, deformable, and elastic second structure, the first structure being carried by the second structure,
the charging station having a first position wherein the first structure is held beneath or substantially level to a first surface, and a second position where the first structure is moved by the second structure to be held beyond the level of the first surface,
wherein the primary coil is embedded in the first structure of the inflatable membrane.

2. The charging station of claim 1 wherein the second structure is a low pressure inflatable bladder.

3. The charging station of claim 1 wherein the first structure is integral with the second structure.

4. The charging station of claim 1 wherein the degree of extension of the primary coil is selectable.

5. The charging station of claim 1 wherein the proximity distance is set by contact of the first structure with the vehicle.

6. The charging station of claim 1 wherein the first surface is a floor.

7. The charging station of claim 1, wherein the primary coil is fully embedded in the first structure of the inflatable membrane.

8. The charging station of claim 1, wherein the inflatable membrane surrounds a side of the primary coils which faces secondary coils or an underside of the electric vehicle.

9. The charging station of claim 1, wherein the inflatable membrane is an integrally formed membrane which surrounds the primary coil.

10. The charging station of claim 1, wherein the first structure of the inflatable membrane encapsulates the primary coil.

11. A charging station for an electric vehicle comprising
a primary coil; and
an inflatable membrane having a primary coil carrying first structure surrounding the primary coil, the inflatable membrane further having an extendable, deformable, and elastic second structure, the first structure being carried by the second structure,
the charging station being mounted in a floor and having an unextended first position wherein the first structure is held beneath or substantially level to the floor, and
a second position is which the primary coil is moved by the second structure to be held substantially above the level of the floor,
so as to achieve a minimal air gap with a secondary coil held in the electric vehicle a distance from the floor,
wherein the primary coil is embedded in the first structure of the inflatable membrane.

12. The charging station of claim 11 wherein the first structure is integral with the second structure.

13. The charging station of claim 11 wherein the second structure is a low pressure inflatable bladder.

14. The charging station of claim 13 wherein a degree of extension of the second structure is variable.

15. The charging station of claim 14 wherein the proximity of the primary coil to the secondary coil is set by contact of the first structure with the vehicle.

16. An electric vehicle charging system comprising:
a charging station mounted in a floor and having a primary coil;
an inflatable membrane having a primary coil carrying first structure surrounding the primary coil, the inflatable membrane further having an extendable, deformable, and elastic second structure, the first structure being carried by the second structure;
a rigid air chamber supporting the inflatable membrane;
the charging station being mounted in a first surface and having an unextended position wherein the primary coil carrying first structure is held beneath or substantially level to the first surface, and an extended position in which the primary coil is moved by the extendable carrier second structure to be held substantially above the level of the first surface, the first surface being the floor;
whereby the charging station extended position is selected so as to achieve a minimal air gap with a secondary coil mounted on an underside of a vehicle,
wherein the primary coil is embedded in the first structure of the inflatable membrane.

17. The charging station of claim 1, further comprising:
a chamber having an opening, the inflatable membrane being arranged to cover the opening of the chamber.

18. The charging station of claim 17, wherein the inflatable membrane seals the opening of the chamber.

19. The charging station of claim 17, wherein the second structure comprises flexible sides of the inflatable membrane which are fastened and sealed to the chamber.

* * * * *